United States Patent [19]

Peters et al.

[11] Patent Number: 5,202,614
[45] Date of Patent: Apr. 13, 1993

[54] SELF-COMMUTATING, BACK-EMF SENSING, BRUSHLESS DC MOTOR CONTROLLER

[75] Inventors: David H. Peters, Westminster; Jeff Harth, Tustin, both of Calif.

[73] Assignee: Silicon Systems, Inc., Tustin, Calif.

[21] Appl. No.: 411,712

[22] Filed: Sep. 25, 1989

[51] Int. Cl.⁵ .................... H02K 29/02; H02P 7/28
[52] U.S. Cl. ............................ 318/254; 318/138
[58] Field of Search ........................ 318/254, 138

[56] References Cited

U.S. PATENT DOCUMENTS

| | | | |
|---|---|---|---|
| 4,532,459 | 7/1985 | Erdman et al. | 318/254 |
| 4,651,069 | 3/1987 | Pellegrini | 368/254 |
| 4,654,566 | 3/1987 | Erdman | 368/254 |
| 4,743,815 | 5/1988 | Gee et al. | 318/254 |
| 4,857,814 | 8/1989 | Duncan | 318/254 |

Primary Examiner—Bernard Roskoski
Attorney, Agent, or Firm—Hecker & Harriman

[57] ABSTRACT

A method and apparatus to commutate the drive voltages of a brushless DC motor. The present invention determines rotor position and velocity by detecting the polarity reversal of the Back-EMF of an undriven leg when compared to a transformed pseudo-reference. In an extra measure of efficiency, the present invention is independent of hardware sensors; it includes a commutation delay timing circuit for optimization of motor operation, and it minimizes the participation of a microprocessor or other microcontroller.

9 Claims, 4 Drawing Sheets 5,202,614

SELF-COMMUTATING, BACK-EMF SENSING, BRUSHLESS DC MOTOR CONTROLLER

BACKGROUND OF THE INVENTION

1. Field of the Invention

This invention is directed at a system to provide commutation control of voltages for brushless DC motors.

2. Background Art

There are methods of electronic commutation of DC motors that time-sample the back-EMF voltage of the undriven leg of a "STAR" configuration motor (a motor which uses a center tap for supply voltage connection). Instantaneous voltage samples relate to rotor angular position. Other methods periodically cut motor current and sample the voltage across all the motor windings. The angular position of the rotor is deduced from the value of these voltages. Still other methods cut motor current and then pulse current through the various motor windings to measure the rotor inductance. The angular position of the rotor relates to rotor inductance. In all of these methods, commutation is linked to the rotor position by translating rotor position to the motor drive signals required to advance the motor into the next commutation state.

The "STAR" motor configuration samples the back-EMF across the undriven leg of a motor employing unipolar drive. This method is inefficient and has other disadvantages. The sampled leg is undriven and is wasted in terms of motor drive. The bipolar motor could be driven as two motor legs in opposite polarities, whereas the "STAR" method is unipolar and only driven in one direction. Further, time sampling of the back-EMF is employed, which may require the continuing use of a microprocessor and extensive hardware. The microprocessor is an expensive device which increases the overall commutator cost. The sampling methods are also dependent on the use of inductive devices to sense current. These sensing devices are also expensive, and usually cannot be made on a monolithic integrated circuit.

Methods that turn off power to measure back-EMF suffer from reduced motor efficiency due to the loss of torque while the measurement takes place. No electrical force can be applied while the sampling is in progress. This inefficiency increases with motor speed. Also, methods which switch motor currents are noisy, both acoustically and electrically.

Prior art designs often require a controller, such as a microprocessor, to periodically participate in the commutation of the motor. Requiring a microprocessor during normal "at-speed" operation of the motor places a real time processing burden on the system microprocessor. The microprocessor is detained from executing other pending tasks and efficiency suffers. For example, where a single microprocessor is used to control various motors, an increased burden from each motor means a lesser ability to control a plurality of motors.

It is an objective of the present invention to provide a DC commutator independent of sampling devices.

It is another objective of the present invention to provide a DC motor commutation system which minimizes the use of undriven motor windings.

It is a further objective of the present invention to provide a DC commutator which is highly efficient.

It is still another object of the present invention to minimize acoustical and electrical noise by avoiding the switching of motor current.

It is yet another object of the present invention to provide for a DC commutation system which minimizes the participation of microprocessor or other controller during at-speed operation.

SUMMARY OF THE INVENTION

The present invention defines a system for the commutation of drive voltages for a brushless DC motor. The present invention's system is highly efficient and is independent of any sensors. It is also relatively independent of microprocessor participation. The present invention is also more general in use and applicability than prior art systems.

The present invention can be utilized with any polyphase motor having two or more phases. The present invention connects to an external motor via a number of connections equal to the number of phases in the motor. The present invention also connects to a supervising controller, such as a microprocessor, which generates the control signals used to initiate motor rotation. Once the supervising controller initiates motor start-up and the motor begins proper rotation, the invention will accelerate the motor in a manner comparable to a brush-based DC motor. No further participation of the controller is required. The motor will accelerate to a speed limited only by motor characteristics or by a speed control loop.

In the present invention, a commutation generator cyclically counts the number of commutation states and sequentially excites one of a plurality of signal lines, each of which denotes a commutation state. The operation of the entire commutator is dependent on the instantaneous signals on these signal lines. The state signal lines are inputted to the commutation logic. The commutation logic transforms the signals into appropriate drive voltages to drive a controlled motor. The control function is executed through a motor driver sub-system, whose function it is to boost the power level of an enable signal to that of a drive signal. A transformation network monitors the instantaneous voltage of the terminal of a controlled motor, and provides a reference level voltage. This reference level voltage is necessary in order to detect the polarity change of the back-EMF on any given motor winding. The polarity reversal change is detected by the back-EMF reversal comparators and edge detection in order to generate a signal which signifies that indeed, a polarity change has occurred. When the polarity change occurs, it signifies an advancement from whatever commutation state the commutator is in to the subsequent commutation state. An edge filter and delay subsystem is used to transform the edge detection signal into a clock signal useful for the commutation generator discussed previously.

DETAILED DESCRIPTION OF THE PRESENT INVENTION

Introduction

Figure 1A:
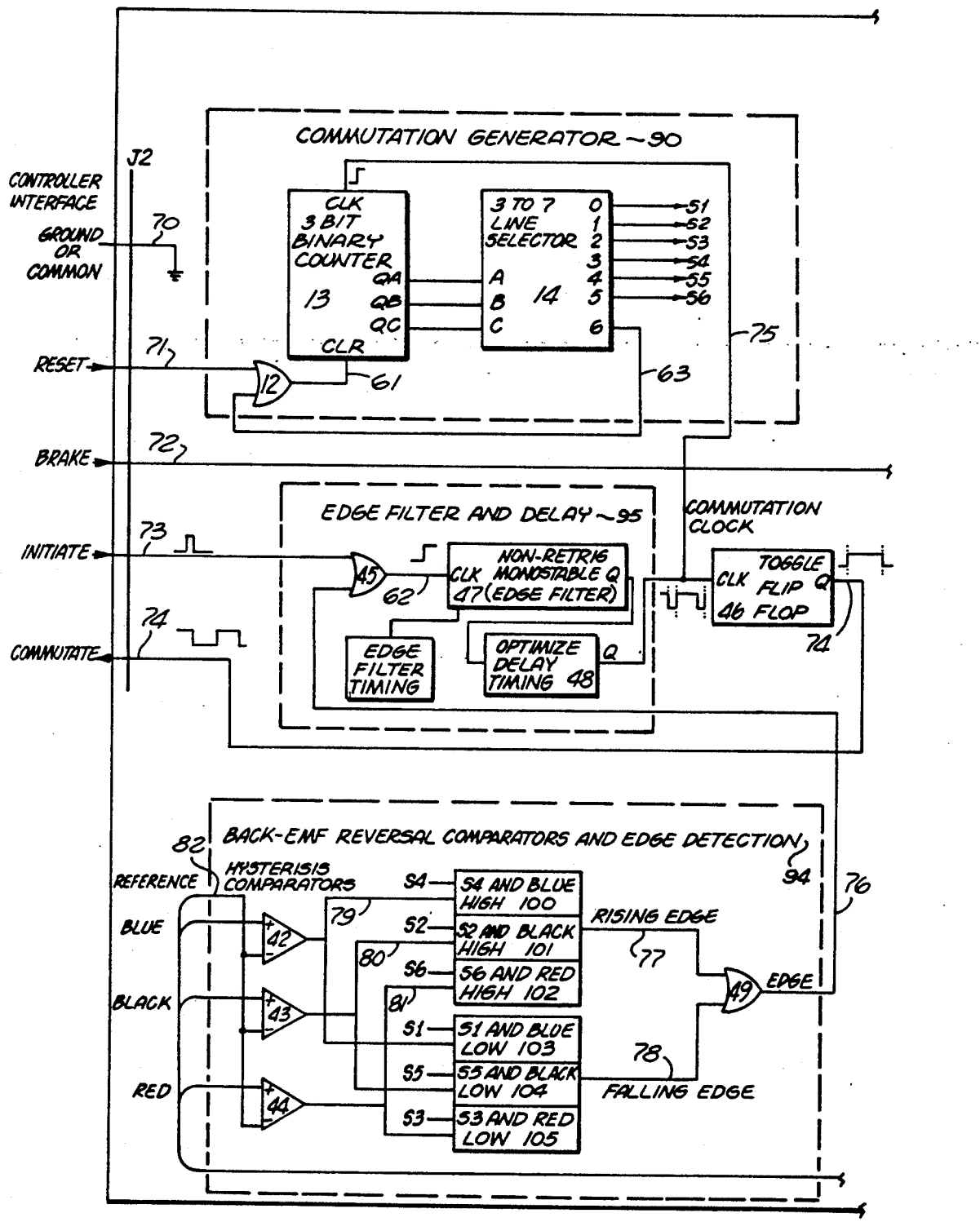
FIG. 1A, 1B are a schematic of the commutator of the present invention.

The present invention provides a commutator system for the drive voltages and currents for a DC motor. In the following description, numerous specific details are set forth such as voltage levels, signal names, etc., in order to provide a more thorough understanding of the present invention. It will be apparent, however, to one skilled in the art, that the present invention may be practiced without these specific details. In other instances, well-known circuits have not been described in detail so as not to obscure the present invention.

The present invention is a design and method for commutating the appropriate drive voltages and currents of a brushless DC motor. The commutator is able to apply the appropriate drive voltages and currents to start the motor, stabilize its speed, or stop it. When necessary, the angular position of a polyphase motor is determined by sensing the back-electromotive force (back-EMF) at one of the motor winding terminals. The commutator interacts with a controller-microprocessor at critical stages of commutator and motor operation.

A motor driver provides the power interface to the external motor. The motor driver is under control of the commutation logic and applies voltage to two motor legs at a time. Current will flow primarily through windings between the motor leg which is driven high and the motor leg which is driven low.

For proper commutation, the commutator must be aware of the angular position of the rotor. In order to determine angular position, the commutator looks for the back-EMF that is produced when the undriven terminal voltage of the motor passes a point corresponding to a certain angular position. When the rotor passes that point, the back-EMF voltage at that terminal will reflect a positive-to-negative or negative-to-positive polarity change relative to a pseudo-reference derived either from a transformation network or from the center tap of a "STAR"-type motor due to the magnetic field within which it is spinning.

The commutator of the preferred embodiment interfaces with a microprocessor controller, a controlled motor and a power source. The preferred embodiment of the present invention includes a commutation generator, commutation logic, motor driver, edge filter and delay, transformation network, and back-EMF reversal comparators and edge detection.

The commutator has three points of connection to external sources and devices. The microprocessor interface is one. It includes a common ground connection and signal lines for "reset," "brake," "initiate," and "commutate." The commutator also connects to a polyphase motor with a connection to each winding leg of the motor. (A three-phase motor, with three windings, would have a three-wire connector to the commutator.) The commutator also connects to a power source.

Motor commutation is driven by an incrementing counter and line selector. The counter is advanced one count on each rising edge of a signal from a commutation clock. The counter automatically advances and resets. State signals, outputted from the selector, are distributed throughout the invention. The invention, when operated in bipolar drive mode, provides twice as many commutation states as there are motor phases. (e.g., for the block diagram in FIG. 1, three motor phases require six such commutation states.)

The necessary motor drive is determined from the state signals. The signals enable the upper and lower voltage source drivers, which drive motor winding legs either high or low. Appropriate logic in the commutator ensures that only one upper driver and one lower driver are enabled at any instant in time under normal motor operation.

To determine a negative-positive or positive-negative crossing, the commutator utilizes a reference voltage level produced by the transformation network. This reference level sufficiently approximates zero to enable the zero-crossing detection comparators to recognize a back-EMF polarity reversal.

The transformation network provides a neutral or common reference point for the back-EMF voltage polarity reversal event associated with commutation advancement. This network consists of impedance elements such as resistors, which form a pseudo-center tap across the motor windings (as illustrated in the detail box 93 of FIG. 1). The transformation network elements are chosen to be close in impedance value to each other and considerably large in relative value as compared to impedance of the motor windings. For "STAR"-type motors, the motor center tap can be directly used in place of the transformation network, if desired.

The present invention determines motor commutation by sensing back-EMF voltage polarity reversal in the undriven motor leg. Comparators with hysterisis compare each motor leg to the output of the transformation network. Hysterisis is provided to prevent possible comparator oscillation. The hysterisis threshold is set small enough so that the comparators remain sensitive to the back-EMF available from the motor at low speeds such as during start up, yet large enough to prevent oscillation.

The undriven leg of the motor does not have its associated motor drive enabled. Under normal motor operation in a three-phase motor, as an example, the other two motor legs will be driven. For a "Y" or "STAR" configuration motor, the differential voltage between the output of the transformation network and the undriven motor leg will be the back-EMF due to motor rotation.

In a "Delta" configured motor, a balanced bridge circuit results. Current flows through the two undriven windings. Since the motor windings are very similar in impedance, the undriven leg will be effectively centered between the upper and lower driven voltage levels. Likewise, the output of the transformation network is centered between the upper and lower driven voltage levels. The differential voltage between the transformation network output and the undriven leg is primarily due to the back-EMF voltage induced by motor rotation.

The qualification logic attached to the comparators determines which comparator to examine and to which polarity reversal edge to respond. Rising transitions are qualified in the upper block, while falling transitions are qualified in the lower block. The qualification logic utilizes the output of the commutation generator through its signal lines. Based on the commutation state, when the expected polarity reversal edge is detected, the commutation "edge" signal is generated and applied to the edge filter.

An edge filter provides a qualification pulse which rejects possible multiple transitions of the "edge" signal due to the commutation action. The edge filter may be implemented as a non-retriggerable monostable which, once triggered, remains triggered, ignoring all inputs until time expires. The "initiate" signal is merged in with the "edge" signal providing a direct means of triggering the edge filter. The external controller activates the "initiate" signal with a narrow duty cycle pulse when implementing the motor start-up procedure.

Optimization of the motor current for full speed motor operation may be implemented by adjusting the period of the time delay circuit. Polarity reversal of the back-EMF voltage occurs earlier than the optimum commutation time. Delaying the commutation clock will reduce the torque ripple and thereby optimize motor efficiency. The output of the edge filter is the input of the optimizing time delay circuit. The output of the optimizing time delay circuit is the commutation clock.

Figure 2:
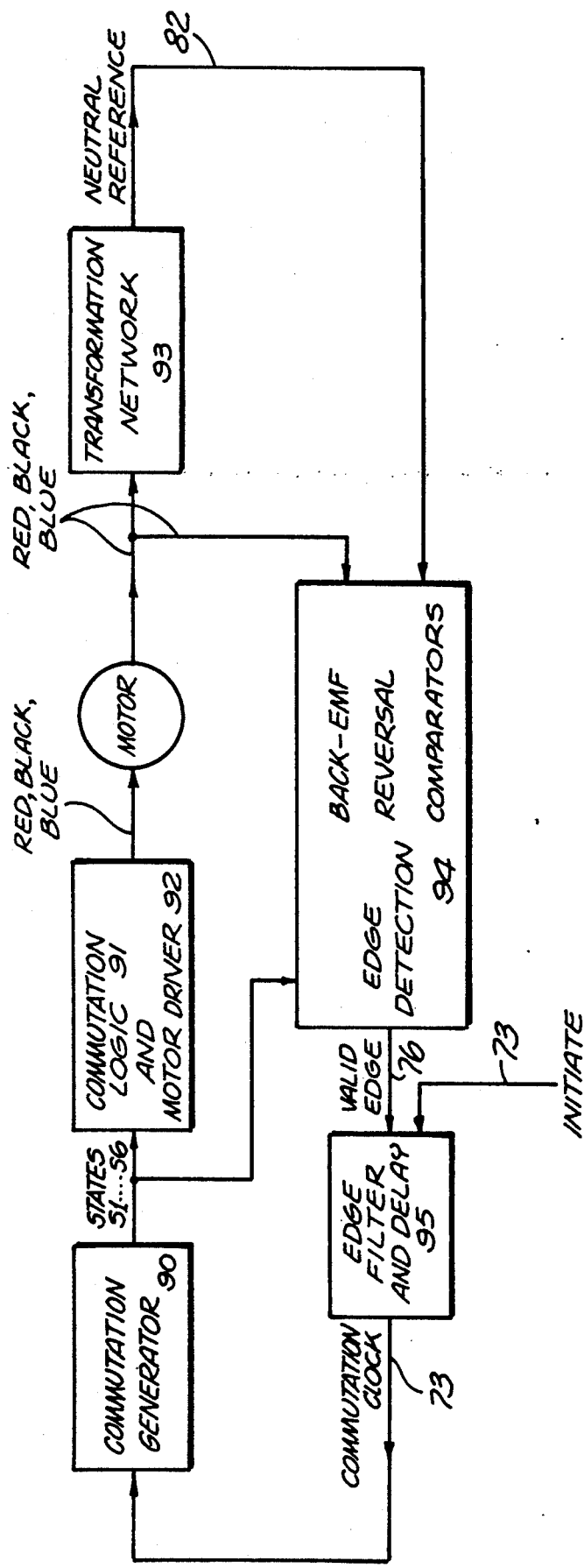
FIG. 2 is a block diagram of the commutator of FIG. 1.

FIG. 2 is a block diagram of a three-phase embodiment of the present invention. Initiate signal 73 is provided to edge filter and delay 95. Edge filter and delay 95 also receives edge signal 76 as input. Edge filter and delay 95 then outputs commutation clock 75. Commutation clock 75 is fed into commutation generator 90, whose clock it advances. Commutation generator 90 has as outputs state signals S1 through S6. These state signals are fed into commutation logic 91. States S1 through S6 are also fed to the edge qualify and select logic 94, in order to enable that logic to make a valid edge decision and appropriate edge output 76.

The motor driven by commutation logic 91 and motor drive 92 is monitored by back-EMF reversal comparators and edge detection 94 and by transformation network 93. Output 82 of transformation network 93 is a neutral reference also input into back-EMF reversal comparators. The back-EMF polarity reversal comparators and edge detection 94 generates a single signal, edge 76, the input to edge filter and delay 95.

Figure 1B:
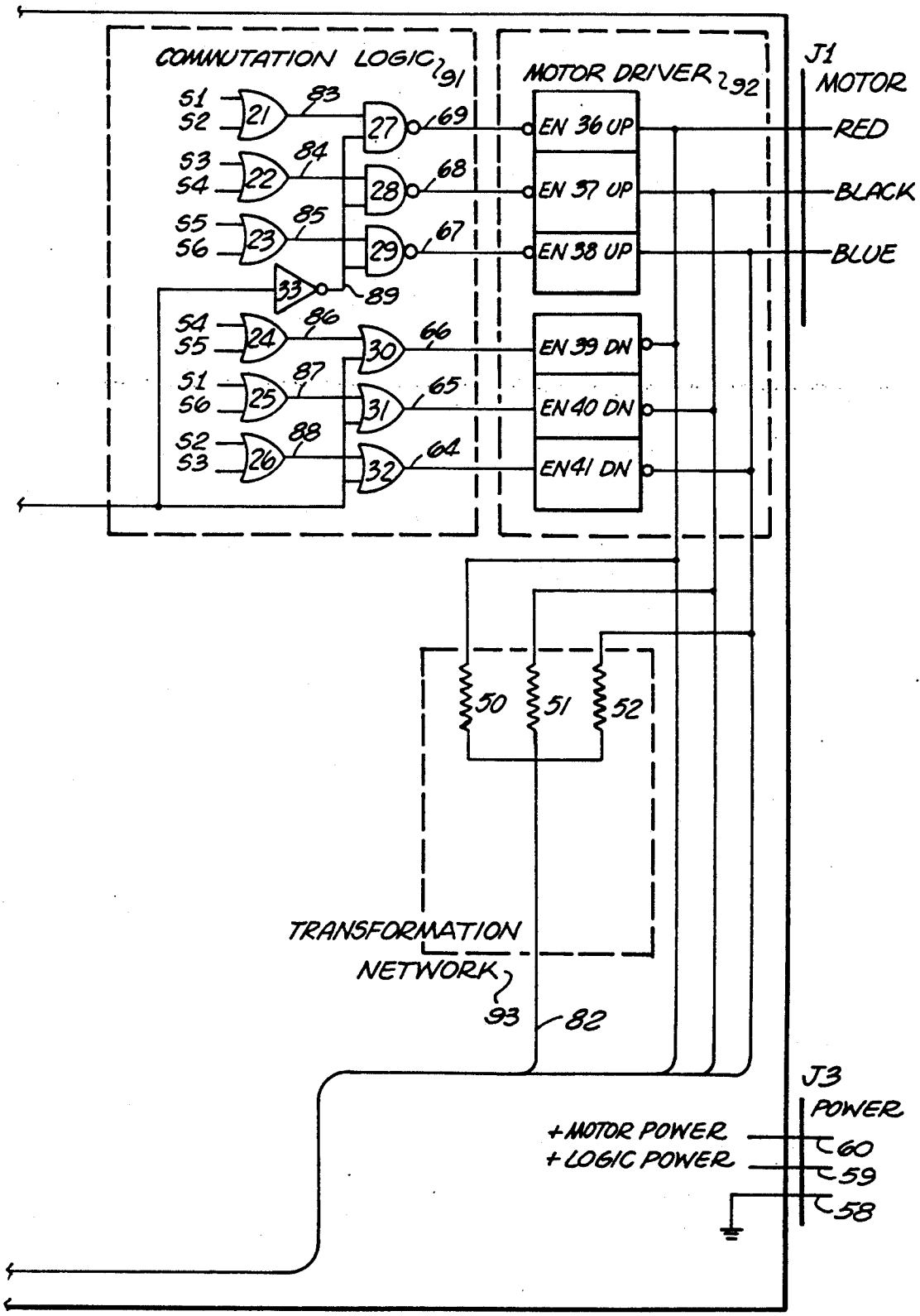

FIG. 1 is a schematic of the preferred embodiment of the present invention, a 3-phase version of a DC motor commutator. The preferred embodiment includes:
commutation generator 90;
commutation logic 91;
motor driver 92;
transformation network 93;
back-EMF reversal comparators and edge detection 94;
edge filter and delay 95.

Also in FIG. 1 are an internal toggle flip-flop 46, and three connectors J1, J2 and J3 used to connect the commutator to a motor, a controller and a power source, respectively.

The controller interface, J2 in FIG. 1, connects the commutator to the controller with five electrical connections. There is ground connection 70, reset signal line 71, brake signal line 72, initiate signal line 73, and commutate signal line 74.

The circuit elements listed above are interconnected by various signal lines. Controller interface J2, for example, has signal lines that connect to commutation generator 90, commutation logic 91, edge filter 95 and toggle flip-flop 46. Motor connector J1 connects directly into motor driver 92. Internally, the connections of motor connector J1 are read by the back-EMF reversal comparators 42-44. State signal lines S1-S6, along with the inputs from the controller interface J2 and motor connector J1, define the proper instantaneous operation of the commutator circuit.

Commutation generator 90 receives as input reset signal 71 from controller interface J2, as well as commutation clock signal 75 output from edge filter and delay 95. The outputs of commutation generator 90 are signal lines S1 through S6. The commutation generator is comprised of three-bit binary counter 13, three-to-seven line selector 14, and OR gate 12. The three outputs of counter 13, QA, QB and QC, are connected to the three inputs of line selector 14, A, B, and C. Output line 6 of selector 14 is connected to line 63, through OR gate 12 to line 61, and then to the clear signal of counter 13. Because of this connection, the counter resets after it counts to binary five. Binary six is a reset pulse via the feedback of selected line 6 of selector 14 into counter 13. Counter 13 is driven by clock signal 75, which it receives from edge filter and delay 95. Commutation clock 75 forces counter 13 to count up from binary 0 through binary 5. Counter 13 then resets itself automatically and begins again.

Commutation logic 91 receives signal lines S1 through S6 and brake signal 72 as input. Commutation logic 91 is comprised of OR gates 21-26 and 30-32, NAND gates 27, 28 and 29 and inverter 33. Commutation logic 91 in FIG. 1 has outputs 64-69. FIG. 1 represents a commutator for a three-phase motor. Signals from commutation logic 91 correspond two-to-one to the terminals of the controlled motor, i.e., commutation logic 91 has two outputs for each terminal. One output enables a driver which drives the voltage applied to that terminal up, the other signal is attached to a driver which drives the voltage attached to that terminal down. Because there are 3 terminals and each terminal must be driven in two directions (at different times), there are six outputs of commutation logic 91.

State signals S1–S6 feed into commutation logic 91 in the following manner. S1 and S2 are connected to the input terminals of OR gate 21. S3 and S4 are connected to the input terminals of OR gate 22. S5 and S6 are connected to the input terminals of OR gate 23. S4 and S5 are connected to the input terminals of OR gate 24. S1 and S6 are connected to the input terminals of OR gate 25. S2 and S3 are connected to the input terminals of OR gate 26.

Brake signal 72 feeds into inverter 33 and OR gates 30, 31 and 32. Output 89 of inverter 33 will be high when brake 72 is low, and conversely. NAND gate 27 receives output 83 of OR gate 21 and output 89 of inverter 33 as input. NAND gate 28 receives output 84 of OR gate 22 and output 89 of inverter 33 as input. NAND gate 29 receives output 85 of OR gate 23 and output 89 of inverter 33 as input. OR gate 30 receives output 86 of OR gate 24 and brake signal 72 as input. OR gate 31 receives output 87 of OR gate 25 and brake signal 72 as input. Or gate 32 receives output 88 of OR gate 26 and brake signal 72 as input. Output 69 of NAND gate 27 is low when the logical AND of output 83 and output 89 are high. Output 68 of NAND gate 28 is low when the logical AND of output 84 and output 89 are high. Output 67 of NAND gate 29 is low when the logical AND of output 85 and output 89 are high. Output 66 of OR gate 30 is high when the logical OR of output 86 and brake signal 72 are high. Output 65 of OR gate 31 is high when the logical OR of output 87 and brake signal 72 are high. Output 64 of OR gate 32 is high when the logical OR of output 88 and brake signal 72 are high.

In summary, signal line 69 is low when either S1 or S2 is high and brake signal 72 is low. Signal line 68 is low when S3 or S4 is high, and brake signal 72 is low. Signal line 67 is low when S5 or S6 is high, and brake signal 72 is low. Signal line 66 is high when S4, S5 or brake 72 is high. Signal line 65 is high when S1, S6 or brake line 72 is high. Signal line 64 is high when S2, S3 or brake signal 72 is high. During the normal operation of the circuit, brake signal 72 will be low so that the brake signal will have no effect on OR gates 30–32, and the inverse 89 of brake signal 72 will be high so that it will have no effect on the output of NAND gates 27–29. Also during normal operation of the circuit, only one of signal lines S1–S6 will be high at any instant. Therefore, at any instant, one of signal lines 67–69 are low and one of signal lines 64–66 are high.

Signal lines 64–69 from commutation logic 91 are connected to motor driver 92. The motor driver boosts the signals of commutation logic 91 to a higher voltage and current. It transforms any one logic signal from commutation logic 91 into a power signal suitable to drive a motor leg either to positive voltage or to negative voltage. Motor driver 92 is comprised of drivers 36–41. Each driver has an enable input. Drivers 36–38 drive voltage up; drivers 39–41 drive voltage down, when enabled. The six outputs of drivers 36–41 are connected to the three terminals of a three-phase motor. Drivers 36 and 39 are connected to motor terminal identified "Red," drivers 37 and 40 are connected to motor terminal identified "Black," drivers 38 and 41 are connected to motor terminal identified "Blue." In this way, the terminals of the controlled motor can be driven in either direction, positive or negative. The terminals are arbitrarily identified as Red, Black and Blue. Any means of identifying the terminals of a polyphase motor may be used.

Remembering that only one of signal lines 67–69 are low and only one of signal lines 64–66 are high at any instant during normal operation of the commutator, the operation of motor driver 92 can be explained. If output 69 is low, then motor driver 36 is enabled and motor tap Red is driven to a high voltage level. If signal line 68 is low, then motor driver 37 is enabled and motor tap Black is driven high. If signal line 67 is low, then motor driver 38 is enabled and motor tap Blue is driven high. If signal line 66 is high, then motor driver 39 is enabled and motor tap Red is driven to a low voltage level. If signal line 65 is high, then motor driver 40 is enabled and motor tap Black is driven to a low voltage level. If signal line 64 is driven high, then motor driver 41 is enabled and motor tap Blue is driven to a low voltage level. Because only one of signal lines 67–69 is low at any instant, and only one of signal lines 64–66 is high at any instant, only one motor terminal is driven high and only one motor terminal is driven low at any instant. Furthermore, the commutation logic 91 ensures that a single motor terminal will never be driven both high and low at the same time. The commutation logic 91 ensures that the motor terminal driven high and the motor terminal driven low are distinct.

Terminals identified as Red, Black and Blue of the motor are connected to transformation network 93. Transformation network 93 is comprised of resistors 50–52 which convert the voltages on the terminals Red, Black and Blue into a single voltage, representative of a pseudo-reference on line 82.

Back-EMF reversal comparators and edge detection 94 receives as input the three instantaneous voltages present on motor terminals Red, Black and Blue. It also receives as input the pseudo-reference on line 82 input by transformation network 93 and state signal lines S1 through S6. Back-EMF reversal detection block 94 is comprised of comparators 42–44, logic blocks 100–105, and OR gate 49. Comparators 42–44 receive as input pseudo-reference 82 outputted by transformation network 93. Each of comparators 42–44 also receives a motor terminal, Blue, Black or Red, as input. These three comparators output signals 79–81. Each signal is then fed into two of the six logic blocks contained within the Black-EMF reversal comparators and edge detection 94. Each logic function block within this circuit element receives as input a different signal line (S1 through S6). The outputs of these six function blocks are grouped into threes. The upper three are fed into more logic which derives a signal called "rising edge," the lower three in the diagram are processed to provide a signal called "falling edge". These two signals are then fed into an OR gate which is the output of the Back-EMF reversal comparator and detection block 94. Signal line 76 is called "edge."

Comparator 42 receives an input motor terminal Blue and pseudo-reference 82. Comparator 43 receives as input motor terminal Black and pseudo-reference 82. Comparator 44 receives as input motor terminal Red and pseudo-reference 82. Output 79 of comparator 42 is high when the voltage level on motor terminal Blue is greater than the voltage level on pseudo-reference 82. Output 79 of comparator 42 is low when the voltage level on motor terminal Blue is less than the pseudo-reference 82 voltage level. Output 80 of comparator 43 is high when the voltage level on motor terminal Black is greater than the voltage level on pseudo-reference 82. Output 80 of comparator 43 is low when the voltage level on motor terminal Black is less than the voltage level on pseudo-reference 82. Output 81 of comparator 44 is high when the voltage level on motor terminal Red is greater than the voltage level on pseudo-reference 82. Output 81 of comparator 44 will be low when the voltage level on motor terminal Red is less than the voltage level on pseudo-reference 82.

Output 79 of comparator 42 feeds into logic block 100 and logic block 103. Output 80 of comparator 43 feeds into logic block 101 and logic block 104. Signal line 81 feeds into logic block 102 and logic block 105. Logic block 100 also receives S4 as input. Logic block 101 also receives S2 as input. Logic block 102 also receives S6 as input. Logic block 103 also receives S1 as input. Logic block 104 receives S5 as input. Logic block 105 receives S3 as input. Logic blocks 100–105 are divided into two groups. Blocks 100–102 provide output signal 77. Logic blocks 103–105 provide output signal 78. Signal line 77 makes the transition from low to high when S4 is high and output 79 makes the transition from low to high; or, S2 is high and signal line 80 makes the transition from low to high; or, S6 is high and signal line 81 makes the transition from low to high.

Logic blocks 103–105 output signal 78. Output 78 makes the transition from low to high when: S1 is high and signal line 79 makes the transition from high to low; or, S5 is high and signal line 80 makes the transition from high to low; or, S3 is high and signal 81 makes the transition from high to low. Output 77, when making the transition from low to high, signifies that the back-EMF on an appropriate motor terminal is making the transition from negative to positive.

Output 78 signifies that the back-EMF on an appropriate motor terminal is making the transition from positive to negative. The appropriateness of any rising or falling transition on a motor terminal is determined by the logic within logic blocks 100-105. The main criterion for the appropriate detection is the status of state signal lines S1-S6. Outputs 77 and 78 are input to OR gate 49. Output 76 of OR gate 49 makes the transition from low to high whenever the logical OR of outputs 77 and 78 make the transition low to high.

Signal 76 feeds into edge filter and optimizing timing delay 95. This function block also receives initiate signal 73 from controller interface J2. Edge filter and optimizing delay 95 comprises OR gate 45, edge filter timing non-retriggerable monostable 47, and optimizing timing delay monostable 48. Output Q of the optimizing timing delay monostable 48 is the output of 95. This signal, commutation clock 75, is one of the inputs to commutation generator 90 discussed earlier. Optimizing timing delay 48 provides adjustable delay from back-EMF polarity reversal detection to actual motor commutation for purposes of motor operation optimization.

Commutation clock 75 feeds into commutation generator 90, as well as toggle flip-flop 46. Toggle flip-flop 46 converts the output of the monostable, a periodic pulse waveform, into a square wave function. Output Q of toggle flip-flop 46 is commutate signal 74 of controller interface J2.

The commutator is provided with power by power connector J3 in FIG. 1. The power connection includes ground 58, a voltage at 60 which provides power for the motor, and another voltage at 59 which powers the logic of the circuit.

Figure 3:
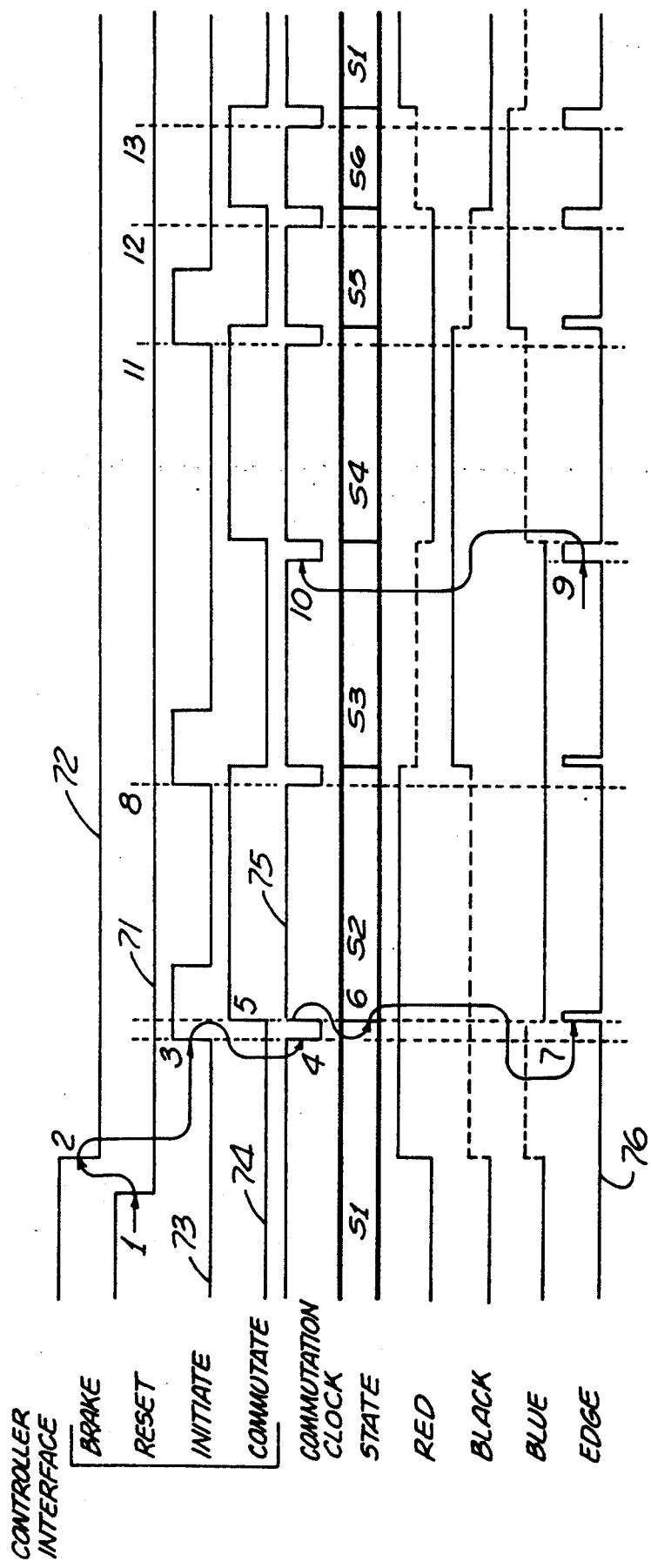
FIG. 3 is a timing diagram showing the relation between various signals relevant to the controller and the commutator.

FIG. 3 is a timing diagram that illustrates the timing cycles of the controller signals, as well as certain signals within the commutator itself. FIG. 3 relates to the timing relations of a three-phase DC motor.

To start the motor, it is necessary to first reset three-bit binary counter 13 as discussed above. This will cause appropriate forces to be generated between the motor's permanent magnet and its coil which will now have current flowing through it. The magnetic field of the permanent magnet and the magnetic field of the coil are skew and exert a torque around the rotor axis, causing the rotor to align with a torque null location. To start the motor spinning, it is necessary to advance the commutation state with initiate signal 73, part of connector J2 in FIG. 1. Initiate signal 73 is applied to OR gate 45, which feeds via line 62 into non-retriggerable monostable multivibrator 47. As illustrated in the timing diagram of FIG. 3, output 75 of monostable 47 pulses into counter 13 which advances counter 13, which then advances state selector 14. The motor is thus advanced for a limited number of cycles until rotor speed is such that back-EMF is generated and an edge, rising or falling, is detected. If the rising or falling edge is detectable, then the clock of counter 3 will be driven by the other input of OR gate 45, edge signal 76, via monostable 47.

On reset 71, (step 1, FIG. 3) OR gate 12 (FIG. 1) is pulsed high and back to low. When reset 71 goes high, output 61 of OR gate 12 also goes high. As output 61 of gate 12 is connected to the clear signal of three-bit binary counter 13, when output 61 of gate 12 goes high, the three-bit output of counter 13 is reset. That is, QA, QB and QC are set to binary 0. QA, QB and QC of counter 13 are directly connected to inputs A, B, and C of selector 14. Therefore, when the outputs QA, QB and QC are reset to binary 0, then output 0 of selector 14 is set high, and outputs 1 through 6 are set low. After reset signal 71 goes low, the only input to commutation generator 90 (comprised of counter 13 and line selector 14) is commutation clock 75. The function of commutation generator 90 is to then sequentially pulse state lines S1 through S6. S1 through S6 represent commutation states. In the commutation logic 91 in FIG. 1, S1 through S6 are distributed through a network of OR gates for steering. In the back-EMF reversal comparator and edge detection block 94, signals S1 through S6 are similarly distributed. The output of selector 14 is such that at any given moment, one and only one of its six outputs is high; the rest are low. After the commutator is reset, brake signal 72 is pulled low (Step 2, FIG. 3) in order to allow motor rotation.

At step 3 of FIG. 3, the initiate signal 73 is pulsed high, causing the falling edge of the commutation clock 75 (step 4). The initiate signal 73 triggers monostable 47, whose output clocks toggle flipflop 46, providing the commutate signal 74 (step 5), and driving the transition from commutation state S1 to commutation state S2 (step 6). An edge detection of the blue output (falling edge) triggers the output of edge signal 76 (step 7).

The transition from commutation state S2 to commutation state S3 at step 8 is similar to the transition from commutation state S1 to commutation state S2. However, the brake signal 72 and reset signal 71 do not undergo any transitions during commutation state S2.

At steps 9 and 10, there is no initiate signal 73 to trigger the monostable 47 and provide a commutation clock signal 75. However, an edge is detected in the back-EMF reversal comparator and edge detection block 94 and edge signal 76 is provided to the delay block 95. This triggers the monostable 47 to provide the commutation clock 75 for the transition from commutation state S3 to commutation state S4.

It is the function of commutation logic 91 in FIG. 1 to translate the signals S1 through S6 into the appropriate drive voltages that will be fed into the windings of the controlled motor.

Suppose that signal line S2 is high and signals lines S1 and S3, S4, S5 and S6 are low. Logically, output 83 and 88 of OR gates 21 and 26 will be high. All the others will be low. Output 83 of OR gate 21 is fed into NAND gate 27. The signal is there ANDed with the inverse of brake signal 72, signal 89. As the brake signal is low, its inverse will be high and the output of 27, the ANDing of two logical 1's, will be low (NAND function). Therefore, input line 69 to driver 36, an element of motor driver 92 in FIG. 1, will be low, which will drive output Red high. Similarly, the output 88 of OR gate 26 will be high. That signal will then be ORed with the brake signal. The output of OR gate 32 is high because input 88 is high. This enables motor driver 41 which, because of an inverter, provides an output which is low. Hence, while line Red is driven high, line Blue is driven low. Line Black, the output of motor drivers 37 and 40, will float. The correlation of a commutation state signal S1 through S6 and the status of lines Red, Black and Blue is illustrated in Table 1.

Transformation network 93 in FIG. 1 is a circuit which combines outputs Red, Black, and Blue to provide a pseudo-reference level on line 82.

TABLE 1
BACK-EMF VOLTAGE REVERSAL AND COMMUTATION

| Commutation state S1...S6 | RED | BLACK | BLUE |
|---|---|---|---|
| 1 | Drive + | Drive − | Falling |
| 2 | Drive + | Rising | Drive − |
| 3 | Falling | Drive + | Drive − |
| 4 | Drive − | Drive + | Rising |
| 5 | Drive − | Falling | Drive + |
| 6 | Rising | Drive − | Drive + |
| and repeating: | | | |
| 1 | Drive + | Drive − | Falling | where:
Drive + means drive this leg to positive rail.
Drive − means drive this leg to ground rail.
Rising means look for negative to positive zero crossing relative to transformation network reference.
Falling means look for positive to negative zero crossing relative to transformation network reference.

Output 82 of transformation network 93 which is a pseudo-reference, as well as the Red, Black, and Blue connection lines, are fed into circuit block 94, back-EMF reversal comparator and edge detection. Hysteresis comparators 42, 43, and 44 compare the voltage on the lines Red, Black, and Blue to output 82 of transformation network 93. This comparison gives a positive signal when any of the voltages is above the pseudo-reference, and negative when the voltages are below pseudo-reference. When a certain state is indicated S1-S6, and back-EMF edge is detected, then edge signal 76, the output of circuit block 94, goes high.

Toggle flip-flop 46 is provided to convert commutation clock 75 into a toggling signal 74, by which the controller can monitor the velocity of the motor. When the controller senses independent commutation of the motor, the controller disengages and stops initiate signal 73. It then continues monitoring commutate signal 74 to check motor rotation speed.

Brake signal 72 is attached to OR gates 30-32 and through inverter 33 to NAND gates 27-29 in commutation decoder 91. When brake signal 72 is high, input 89 to NAND gates 27, 28, and 29 is low (because of inverter 33), and motor drivers 36 through 38 are disabled. When brake signal 72 is high, the input to OR gates 30, 31, and 32 is high, and so are their outputs 64-66, thus enabling motor drivers 39 through 41. The Red, Black, and Blue windings are driven low. This is an effective brake on the motor.

Thus, a novel method and apparatus for a self-commutating back-EMF sensing, brushless DC motor controller has been described.

We claim:

1. A circuit for commutating the voltage supply for a polyphase DC motor comprising:
    a commutation generator that receives as input a first signal and outputs a first binary word of a first number of binary digits;
    a commutation decoder that decodes said binary first word output of said commutation generator and generates a second binary word composed of a second number of bits;
    a motor driver which receives said second binary word and outputs a plurality of drive signals on a plurality of output lines, said plurality of output lines being connected to a plurality of terminals on a controlled motor;
    a transformation network attached to said plurality of output lines from said motor driver, said transformation network deriving a pseudo-reference voltage level from said plurality of output lines;
    a plurality of comparator circuits for comparing the voltage level on each of said output lines with said pseudo-reference voltage level and for providing as output a second signal dependent on the comparison of said levels;
    a logic circuit connected to the output of said plurality of comparators, said logic circuit deriving a third signal by combining said output of said plurality of comparators with said first binary word of said commutation generator;

2. The circuit of claim 1, wherein said commutation generator further receives a first external signal, said first external signal used by said commutation generator to determine a proper form of said first binary word.

3. The circuit of claim 1 further including a filter, wherein said filter receives a second external signal, said second external signal used by said filter circuit to provide said first signal.

4. The circuit of claim 1, wherein said first signal is connected to a conversion means which converts said first signal to a fourth signal.

5. The circuit of claim 4, wherein said fourth signal is provided to an external controller.

6. The circuit of claim 1, wherein said commutation logic receives a third external signal, said third external signal used by said commutation logic to determine proper form of said second binary word.

7. A method for controlling the commutation of the supply voltage of a DC motor comprising the steps of:
    cyclically counting a plurality of commutation states of said motor; advancing said counting on cue of a first signal;
    converting said counting into a set of voltages, said set appropriate for driving a DC motor through all or part of a revolution;
    monitoring a plurality of circuit points within said DC motor to produce a data set;
    transforming said data set from said plurality of circuit points into a second signal;
    comparing said data set with said signal, and deriving a third signal indicative of changing relative polarities of said data set with respect to said second signal;
    filtering said third signal to produce said first signal; driving said motor with one of said set of voltages.

8. The method of claim 7, wherein said counting takes place on a plurality of binary data lines.

9. The method of claim 7, wherein said converting of counting into a set of voltages creates said set with one value of a first polarity and one value of a second polarity, said set comprising at least three voltages.

* * * * *